United States Patent

[11] 3,570,528

| [72] | Inventor | Willi Kramer |
| | | Waiblingen, Germany |
| [21] | Appl. No. | 823,334 |
| [22] | Filed | May 9, 1969 |
| [45] | Patented | Mar. 16, 1971 |
| [73] | Assignee | Daimler-Benz Aktiengesellschaft |
| | | Stuttgart-Unterturkheim, Germany |
| [32] | Priority | May 9, 1969 |
| [33] | | Germany |
| [31] | | P 17 51 313.2 |

[54] INSTALLATION FOR CHECKING THE OIL LEVEL IN OIL-CONSUMING DEVICES, ESPECIALLY IN INTERNAL COMBUSTION ENGINES
20 Claims, 1 Drawing Fig.

[52] U.S. Cl. ..................................... 137/423,
123/136, 123/139.16
[51] Int. Cl. ..................................... F16k 33/00,
F02m 5/00
[50] Field of Search ........................... 137/38, 44,
386, 394, 423, 429; 73/(Inquired); 123/73 (A3),
136, 139.16

[56] References Cited
UNITED STATES PATENTS

| 2,412,019 | 12/1946 | Walker | 123/136 |
| 2,798,436 | 7/1957 | Teasdale | 137/423x |
| 2,818,879 | 1/1958 | Moseley et al. | 137/423 |
| 3,242,937 | 3/1966 | Morin | 137/44x |

Primary Examiner—William F. O'Dea
Assistant Examiner—David R. Matthews
Attorney—Craig, Antonelli, Stewart & Hill ABSTRACT: An installation for checking the oil level in oil-consuming engines, especially in internal combustion engines, in which two float members, arranged as far from one another as possible, are provided in the oil sump which set into operation a refill mechanism when both float members have simultaneously assumed a position corresponding to the lowest permissive oil level over a predetermined period of time.

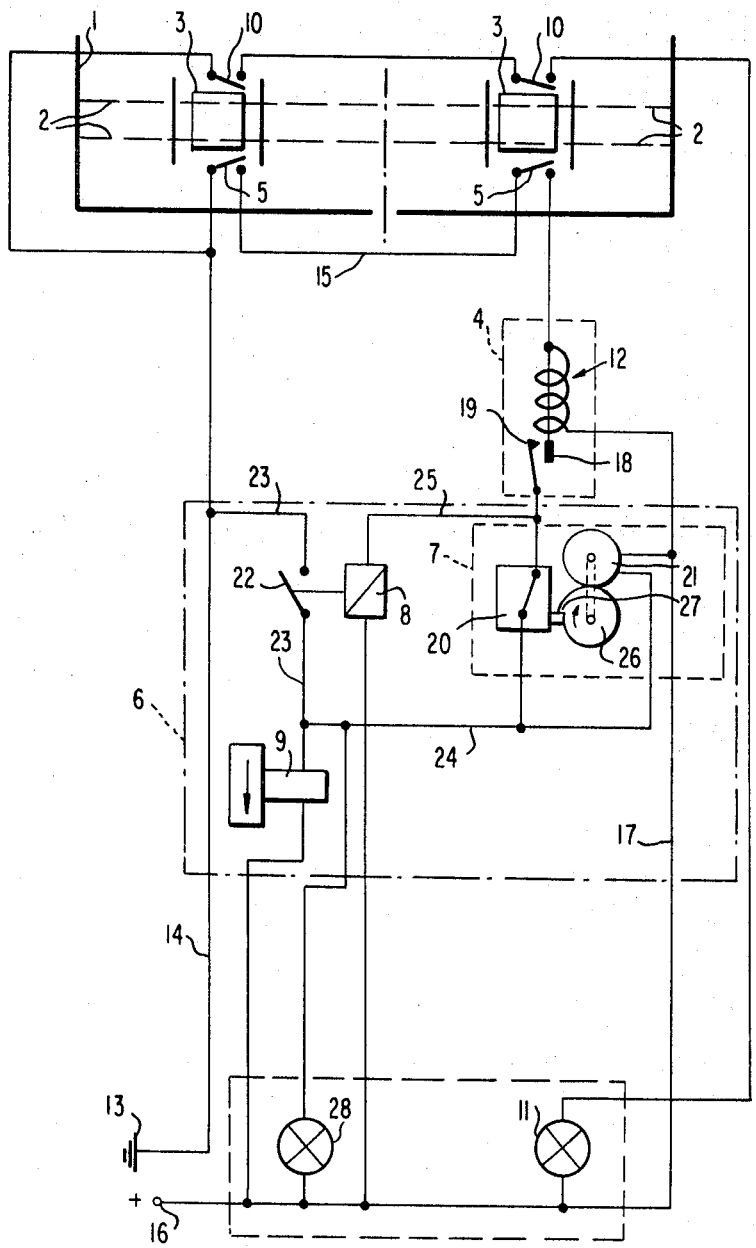

INSTALLATION FOR CHECKING THE OIL LEVEL IN OIL-CONSUMING DEVICES, ESPECIALLY IN INTERNAL COMBUSTION ENGINES

The present invention relates to an installation for monitoring the oil lever in oil-consuming machines, especially in internal combustion engines, in which upon reaching the lowest permissive oil level, an oil quantity adapted to be metered is automatically replenished.

An installation is already known in the prior art in which upon dropping below a predetermined oil level, a float member sets into operation a refill mechanism by way of a bimetallic-delay element. This prior art installation, however, entails the disadvantage that when driving through curves, on inclines and over poor road stretches, the oil level may fluctuate to such an extent that the float member transmits to the bimetallic delay member rapidly following pulses whereby the bimetallic delay member responds after a certain time and turns on the refill installation without an actual shortage or lack of oil prevailing in the engine. As a result thereof, the oil level increases nonpermissively and uncontrollably which may lead to an increase of the oil temperature and to an oil discharge.

It is an object of the present invention to eliminate the aforementioned shortcomings and to create an installation in which an oil-refilling occurs only with an actual oil need.

Consequently, an installation for monitoring the oil level with oil-consuming machines, especially internal combustion engines, in which upon reaching the lowest permissive oil level, an oil quantity adapted to metered is automatically refilled is proposed, in which, according to the present invention at least two float members arranged as far as possible from one another, preferably diagonally opposite one another, are provided by means of which a refill installation is then set into operation, when both floats have assumed simultaneously over a predetermined period of time, a position corresponding to the lowest permissive oil level.

In a preferred embodiment of the present invention, the float members close two series-connected contacts upon reaching the permissive lowest oil level whereby a delay member is turned on which, after an adjustable time, turns on the refill installation. This delay member may be constructed as bimetallic switch.

According to a further feature of the present invention, the refill installation may consist of an electrically driven control mechanism, of a relay and of a magnetic valve and may be triggered off upon response of the bimetallic switch whereby the control mechanism upon termination of the refill operation opens a switch by means of a switch cam which causes the relay to be deenergized.

However, it is also possible in accordance with the present invention to utilize an electric delay unit in lieu of an electrically driven control mechanism.

Appropriately, a self-holding of the relay takes place upon response of the relay by the closing of a contact, whereby upon opening of the bimetallic switch, the refill installation continues to remain in operation.

In one advantageous type of construction of the present invention, an indicating lamp mounted, for example, at the instrument panel, lights up upon reaching the lowest permissive oil level after the closing of the bimetallic switch, which indicating lamp is turned off after the termination of the refill operation.

Furthermore, it is appropriate if the float members close two series-connected contacts upon reaching the highest permissive oil level which contacts cause a lighting-up of a warning light mounted, for example, at the instrument panel.

Accordingly, it is an object of the present invention to provide an installation for monitoring the oil level in oil consuming machines, especially internal combustion engines which avoids by simple means the aforementioned shortcomings and drawbacks encountered in the prior art.

Another object of the present invention resides in an installation for checking the oil level in internal combustion engines, especially of motor vehicles, which only actuates the refill installation when an actual lack of oil exists in the engine.

A further object of the present invention resides in a refill installation for the oil system of oil-consuming machines, especially internal combustion engines, which is simple in construction and reliable in operation, and which produces a meaningful indication of the existing conditions.

These and further objects, features and advantages of the present invention will become more obvious from the following description when taken in connection with the accompanying drawing which shows, for purposes of illustration only, one embodiment in accordance with the present invention, and wherein:

The single FIG. is a schematic diagrammatic view of a monitoring installation for the oil level in accordance with the present invention.

Referring now to the single FIGURE of the drawing, reference numeral 1 designates the schematically shown oil pan or sump with the two extreme oil levels 2 also indicated therein. Two conventional float members 3 disposed as far from one another as possible, preferably disposed diagonally opposite one another, are arranged in the oil pan 1. A delay member 4 which is actuated by the simultaneous closing of two series-connected contacts 5, influences or controls a refill installation 6 which consist of an electrically driven control mechanism 7, of a relay 8 and of a magnetic valve 9. In the illustrated position of the float members 3, neither the refill installation 6 responds nor a warning light 11, energized by the simultaneous closing of two contacts 10 which serves for the indication of an excessively high oil level, light up. Even driving over poor road stretches and the use of the vehicle in mountainous terrain does not lead to an engagement of the refill installation 6 because the arrangement of the float members 3 is so selected that only with an actual oil shortage, the two contacts 5 are closed for longer periods of time. If this takes place, then the delay member 4 responds which is constructed as a bimetallic switch generally designated by reference numeral 12 because a current circuit is closed by way of a line 14 connected with ground, of a line 15, connecting the two closed contacts 5 and a line 17 connected to the positive terminal. After a predetermined, advantageously preselectable period of time, the switch contact 18 of the bimetallic switch 12 has moved to such an extent toward a contact 19 that an electrically conductive connection results whereby, in addition to the relay 8, also the magnetic valve 9 opening up the oil supply and an electric motor 21 controlling the refill operation are actuated or turned on by way of a switch 20 of the control mechanism 7. Upon energization of the relay 8, a contact 22 is closed whereby a self-holding of the relay 8 occurs by way of a line 23 branching off from the line 14, a line 24, the closed switch 20 and a further line 25. With rising oil level in the oil pan 1, an opening of the contacts 5 takes place by means of the float members 3 whereby the switch contact 18 of the bimetallic switch 12 disengages itself from the contact 19. By reason of the continuing holding circuit, however, the refill operation is not interrupted. This takes place only when the cam disc 26 rotating in the direction of the arrow and driven by the electric motor 21, controls, i.e., opens the switch 20 shortly prior to the end of the rotation by means of its switch cam 27 so that the relay 8 is disconnected from ground 13 whereupon the entire installation assumes anew the initial, illustrated position ready for operation and an indicating lamp 28 connected with the lines 17 and 24, which lights up during the refill operation, becomes again extinguished.

Furthermore, the installation in accordance with the present invention offers the possibility of a continuous indication of the oil level in a manner not shown in detail herein since such arrangement is conventional. For that purpose, the arithmetic average of the two float positions is transmitted to an indicating apparatus, preferably mounted at the dashboard or instrument panel, by conventional means providing also a damping in the usual manner.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. An installation for supervising the oil level in oil-consuming machines, especially in internal combustion engines, in which upon reaching the lowest permissive oil level, an oil quantity adapted to be metered is automatically replenished, characterized by at least two float means arranged as far as possible from each other, refill means, and connecting means operatively connecting said float means with said refill means in such a manner that the refill means is set into operation if both float means have simultaneously assumed a position over a predetermined period of time corresponding to the lowest permissive oil level.

2. An installation according to claim 1, characterized in that the float means are arranged diagonally opposite one another in oil sump.

3. An installation according to claim 1, characterized in that the float means, upon reaching the lowest permissive oil level, close two series-connected contacts, delay means energized by closing of said contacts and operatively connected with said refill means for turning on said refill means after a predetermined time of actuation of said delay means.

4. An installation according to claim 3, wherein said predetermined time is adjustable.

5. An installation according to claim 4, characterized in that the delay means is constructed as bimetallic switch means.

6. An installation according to claim 5, characterized in that said refill means includes an electrically driven control mechanism, relay means and a magnetic valve, said refill means being engaged upon response of the bimetallic switch means, said control mechanism having a switch cam means controlling a switch means and opening said switch means by said switch cam means upon termination of the refill operation and said relay means being deenergized upon opening of said switch means.

7. An installation according to claim 6, wherein said control mechanism includes an electric delay unit.

8. An installation according to claim 7, characterized in that upon response of the relay means, a holding circuit means therefor is established by closing of a further contact, said holding circuit means being operable to continue the refill means in operation upon opening of said bimetallic switch means.

9. An installation according to claim 8, characterized in that upon reaching the lowest permissive oil level after closing of the bimetallic switch means, an indicating lamp is energized, and in that said lamp is again extinguished after termination of the refill operation.

10. An installation according to claim 9, wherein said indicating lamp is arranged at an instrument panel.

11. An installation according to claim 9, characterized in that the float means, upon reaching the highest permissive oil level, close two series-connected contacts which are in a circuit leading to a warning light.

12. An installation according to claim 11, characterized in that said warning light is arranged at the instrument panel.

13. An installation according to claim 12, wherein said indicating lamp is arranged at an instrument panel.

14. An installation according to claim 13, characterized in that the float means are arranged diagonally opposite one another in an oil sump.

15. An installation according to claim 3, characterized in that said refill means includes an electrically driven control mechanism, a relay means and a magnetic valve, said refill means being engaged upon response of the delay means, said control mechanism being provided with a switch cam means controlling a switch means and opening said switch means be said switch cam means upon termination of the refill operation and said relay means being deenergized upon opening of said switch means.

16. An installation according to claim 15, characterized in that upon response of the relay means, a holding circuit means therefor is established by closing of a further contact, said holding circuit means being operable to continue the refill means in operation upon deenergization of said delay means.

17. An installation according to claim 3, characterized in that upon reaching the lowest permissive oil level after energization of the delay means, an indicating lamp is energized and that said lamp is again extinguished after termination of the refill operation.

18. An installation according to claim 17, wherein said indicating lamp is arranged at an instrument panel.

19. An installation according to claim 1, characterized in that the float means upon reaching the highest permissive oil level close two series-connected contacts which are in a circuit leading to a warning light.

20. An installation according to claim 19, characterized in that said warning light is arranged at the instrument panel.